(12) United States Patent
Li

(10) Patent No.: US 12,094,168 B2
(45) Date of Patent: Sep. 17, 2024

(54) METHOD, APPARATUS, ELECTRONIC DEVICE AND STORAGE MEDIUM FOR IMAGE DISTORTION CALIBRATING

(71) Applicant: Black Sesame Technologies Inc., San Jose, CA (US)

(72) Inventor: Wenxue Li, Wuhan (CN)

(73) Assignee: Black Sesame Technologies Inc., San Jose, CA (US)

( * ) Notice: Subject to any disclaimer, the term of this patent is extended or adjusted under 35 U.S.C. 154(b) by 414 days.

(21) Appl. No.: 17/512,461

(22) Filed: Oct. 27, 2021

(65) Prior Publication Data

US 2022/0138985 A1 May 5, 2022

(30) Foreign Application Priority Data

Oct. 29, 2020 (CN) .......................... 202011182448.1

(51) Int. Cl.
 *G06T 7/194* (2017.01)
 *G06T 5/50* (2006.01)
 *G06T 5/80* (2024.01)
 *G06T 7/80* (2017.01)

(52) U.S. Cl.
 CPC ................. *G06T 7/80* (2017.01); *G06T 5/50* (2013.01); *G06T 5/80* (2024.01); *G06T 7/194* (2017.01); *G06T 2207/20221* (2013.01)

(58) Field of Classification Search
 CPC .. G06T 7/80; G06T 7/194; G06T 5/50; G06T 5/80; G06T 2207/20221
 See application file for complete search history.

(56) References Cited

U.S. PATENT DOCUMENTS

| | | | |
|---|---|---|---|
| 2017/0332014 A1* | 11/2017 | Shih | H04N 23/698 |
| 2018/0240265 A1* | 8/2018 | Yang | G06V 40/162 |
| 2019/0082160 A1* | 3/2019 | Yano | G06T 15/205 |
| 2020/0394770 A1* | 12/2020 | Roulet | G06T 7/50 |

OTHER PUBLICATIONS

Shih, YiChang, Wei-Sheng Lai, and Chia-Kai Liang. "Distortion-free wide-angle portraits on camera phones." ACM Transactions on Graphics (TOG) 38, No. 4 (2019): 1-12. (Year: 2019).*

(Continued)

*Primary Examiner* — Carol Wang
(74) *Attorney, Agent, or Firm* — Timothy T. Wang; Ni, Wang & Massand, PLLC

(57) ABSTRACT

A method, an apparatus, an electronic apparatus, and a storage medium for image distortion calibration are provided. In the method, an original image is obtained. The original image includes a background region and a foreground object region. A background distortion calibration is performed on the original image for obtaining a first calibrated image. The foreground object distortion calibration is performed to the original image for obtaining the second calibrated image. The background region in the first calibrated image and the foreground object region in the second calibrated image are fused for obtaining a calibrated image. The method can not only calibrate the distortion of the background of the original image but also preserve the shape of the foreground object, thus improving the presenting effect of the calibrated image.

14 Claims, 12 Drawing Sheets

(56) References Cited

OTHER PUBLICATIONS

YiChang Shih, Wei-Sheng Lai, and Chia-Kai Liang, Distortion-Free Wide-Angle Portraits on Camera Phones, ACM Transactions on Graphics, vol. 38, Issue 4, Article No. 61pp. 1-12, https://doi.org/10.1145/3306346.3322948.

Longguo Liu, The Research and Optimization on the Technology of Depth-Image-Based Rendering, China Master's Theses Full-text Database, vol. 12, 2019, China.

Bo Yang, Hua Jun Feng etc., Automatical Content-Adapting Stretched Distortion Correction Algorithm for Wide-Angle Images, Journal of Zhejiang University (Engineering Science), vol. 50, Issue 9, Sep. 2016, China.

Peishuang Sun, The Research on Fisheye Image Distortion Correction Algorithm, China Master's Theses Full-text Database, vol. 2, 2017, China.

\* cited by examiner

METHOD, APPARATUS, ELECTRONIC DEVICE AND STORAGE MEDIUM FOR IMAGE DISTORTION CALIBRATING

CROSS-REFERENCE TO RELATED APPLICATIONS

The application claims priority to Chinese patent application No. 202011182448.1, filed on Oct. 29, 2020, the entire contents of which are incorporated herein by reference.

TECHNICAL FIELD

The present disclosure relates to the field of image processing technologies, and more specifically, to a method, an apparatus, an electronic device and a storage medium for image distortion calibrating.

BACKGROUND

Currently, more and more electronic products, e.g. mobile phones, are integrated with an ultra-wide-angle camera module, and the field of view (FOV) of the ultra-wide-angle camera module can generally be larger than 100 degrees, which can obtain a wider photographing field of view. Due to the manufacturing accuracy of the camera lens and the deviation during the assembly processes, the ultra-wide-angle camera module will introduce more distortion, resulting in the distortion of the captured original images.

The camera internal parameters of the camera module can be used to calibrate the camera distortion of the original images, so as to eliminate the distortion phenomenon in the original images. However, when the background and a foreground object in front of the background, such as a portrait, simultaneously exist in the original image, distortion calibration is performed on the image by the above method, although the distortion of the background in the calibrated image can be improved, however, since there is a stretching-like operation in distortion calibration, the portrait and the like in the calibrated image are deformed.

SUMMARY

In view of the above, it is necessary to provide an improved image distortion calibrating method. According to one aspect of the present disclosure, an image distortion calibration method is provided. The method includes obtaining an original image including a background region and a foreground object region, performing background distortion calibration on the original image for obtaining a first calibrated image, performing a foreground object distortion calibration to the original image to obtain a second calibrated image, and fusing the background region in the first calibrated image and the foreground object region in the second calibrated image for obtaining a calibrated image.

According to another aspect of the present disclosure, an image distortion calibration apparatus is provided. The apparatus includes an image obtaining module for obtaining an original image including a background region and a foreground object region, a first calibration module for performing a background distortion calibration on the original image to obtain a first calibrated image, a second calibration module for performing a foreground object distortion calibration on the original image to obtain a second calibrated image, and an image fusing module for fusing the background region in the first calibrated image and the foreground object region in the second calibrated image to obtain a calibrated image.

According to a further aspect of the present disclosure, an electronic device including a memory and a processor is provided. The memory is connected to the processor and stores a computer program. The following steps are implemented when the processor executes the computer program: obtaining an original image including a background region and a foreground object region, performing a background distortion calibration on the original image for obtaining a first calibrated image, performing a foreground object distortion calibration to the original image to obtain a second calibrated image, and fusing the background region in the first calibrated image and the foreground object region in the second calibrated image for obtaining a calibrated image.

A computer-readable storage medium having stored thereon a computer program is provided. When being executed by a processor, the following steps are implemented: obtaining an original image including a background region and a foreground object region, performing a background distortion calibration on the original image for obtaining a first calibrated image, performing a foreground object distortion calibration to the original image to obtain a second calibrated image, and fusing the background region in the first calibrated image and the foreground object region in the second calibrated image for obtaining a calibrated image.

In the image distortion calibration method, the apparatus, the electronic device and the storage medium, a background distortion calibration is performed on an original image to obtain a first calibrated image, a foreground object distortion calibration is performed on the original image to obtain a second calibrated image, and an image fusing based on the background region in the first calibrated image and the foreground object region in the second calibrated image for obtaining a calibrated image, so that the distortion of the background region and the foreground object region are respectively calibrated pertinently, while the distortion of the background of the original image is calibrated, the preservation of the foreground object is taken into account, the presenting effect of the calibrated image obtained by the calibration is improved.

DETAILED DESCRIPTION OF THE EMBODIMENTS

In order to make the above objects, features and advantages of the present disclosure easier to understood, specific embodiments of the present disclosure will be described in detail with reference to the accompanying drawings. Although numerous specific details are set forth in the following description, it is intended that the present disclosure be fully understood and not to limit the protection scope of the present disclosure.

Figure 1:
FIG. 1 is an original image in one embodiment.

The original images captured by the ultra-wide-angle camera module usually have image distortion. FIG. 1 is an original image captured by an ultra-wide angle camera module according to one embodiment. As can be seen from FIG. 1, there is an obvious curved deformation, namely, the image distortion, in the black-and-white squares of the background region in the original image. The more far away from the center of the image, the more serious the distortion is.

Figure 2:
FIG. 2 is a first calibrated image in one embodiment.

In order to eliminate the distortion in the image, the camera distortion calibration can be performed on the original image by using the internal parameters of the ultra-wide angle camera module, and the calibrated image is shown in FIG. 2. As can be seen from the FIG. 2, after the distortion calibration is performed in this manner, the black and white squares of the background area in the calibrated image are restored to be flat, that is, the background distortion is eliminated. However, the portrait in front of the background is obviously deformed due to the stretching-like operation of distortion calibration.

Accordingly, the present disclosure aims to provide an image distortion calibration method that can calibrate the distortion of a background in an original image while preserving the shape of a foreground object in the original image at the same time.

Figure 3:
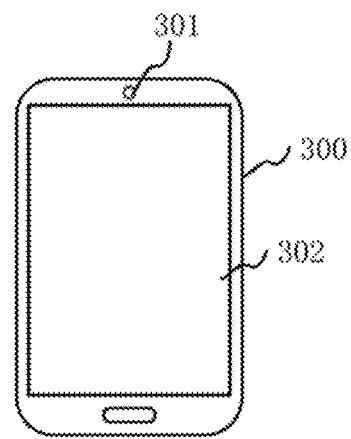
FIG. 3 is a schematic diagram of an electronic device according to an embodiment.

The image distortion calibration method provided by the present disclosure can be applied to the electronic device 300 as shown in FIG. 3. The electronic device 300 may include, but is not limited to, various smart phones, digital cameras, personal computers, notebook computers, tablet computers, and the like. The electronic device 300 can be loaded with a camera 301. The electronic device 300 obtains an original image through a real-time shooting by the camera 301, and performs the image distortion calibration method according to the embodiment of the present disclosure on the original image. Thus, distortion calibration is performed on the original image to obtain a calibrated image. The electronic device 300 can also be loaded with a display screen 302, so that the electronic device 300 can display the calibrated image on the display screen 302 in real time for the user to view.

Figure 4:
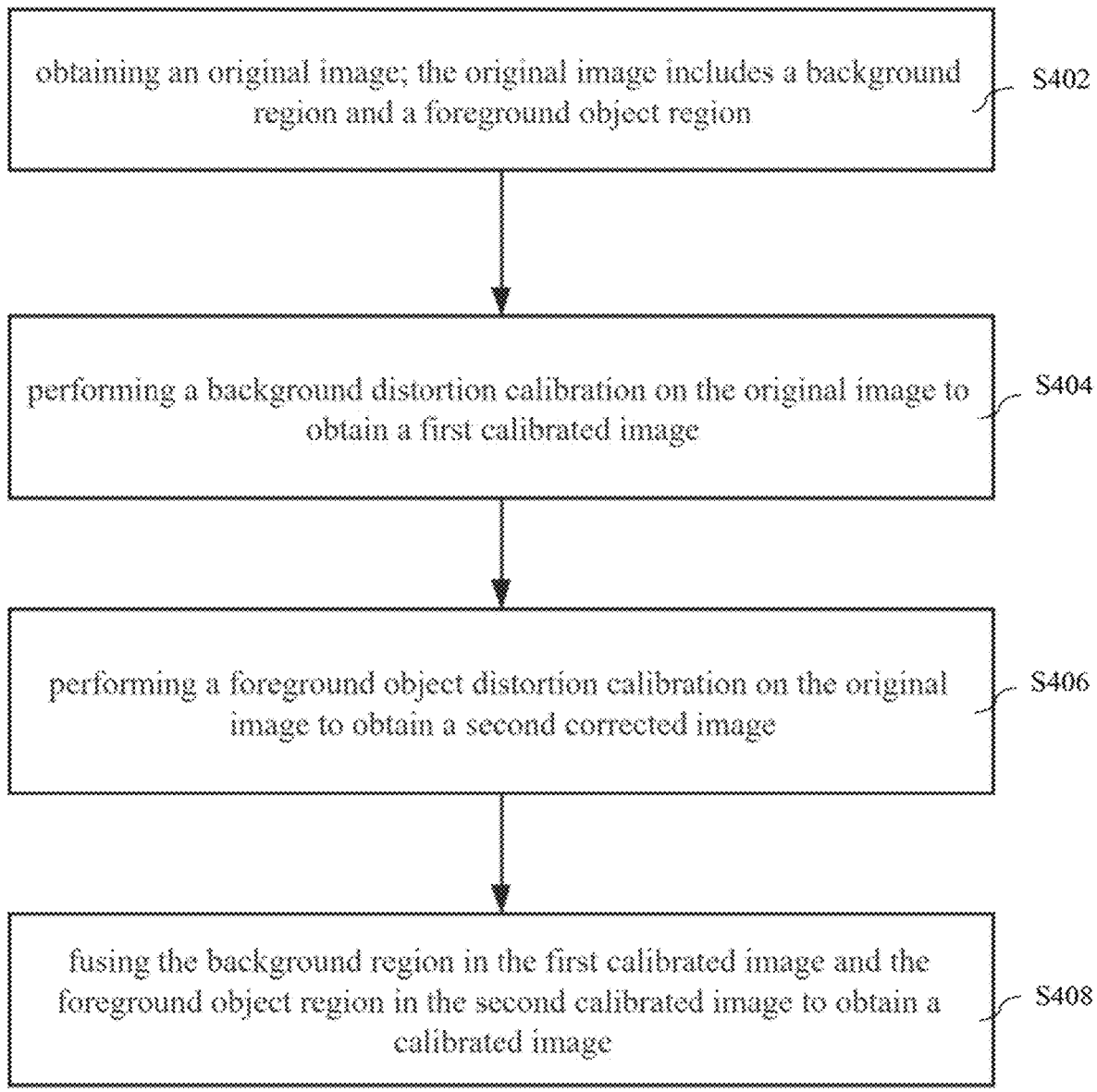
FIG. 4 is a flow chart of a distortion calibration method according to an embodiment.
Figure 5:
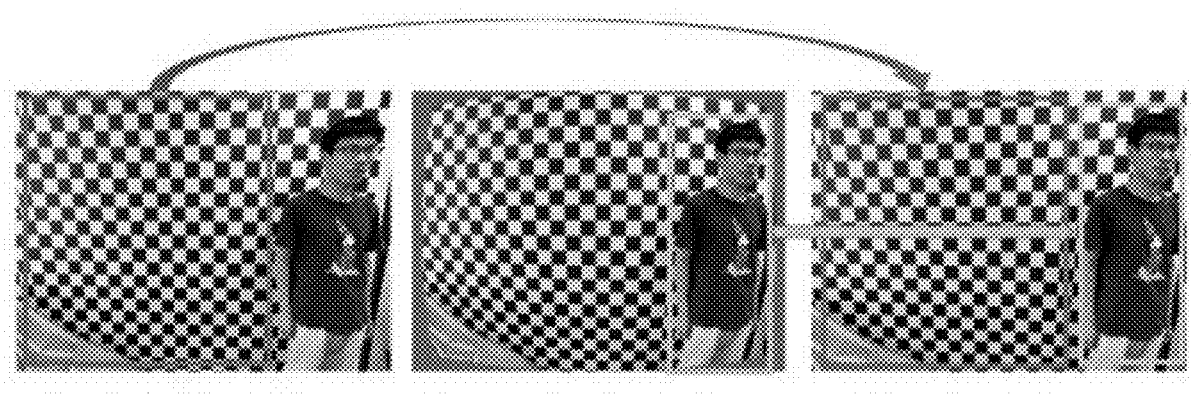
FIG. 5 is a schematic diagram of a distortion calibration method in an embodiment.

In one embodiment, an image distortion calibration method which can be applied to an electronic device 300 as shown in FIG. 1 is provided. As shown in FIG. 4 and FIG. 5, the method includes the following steps.

In step S402, an original image is obtained. The original image includes a background region and a foreground object region.

Wherein, the original image is an unprocessed image captured by cameras.

In various embodiments of the present disclosure, cameras may include various types of devices capable of capturing images, such as a camera, a camera module, and the like.

The original image can be obtained in various ways. In the present embodiment, taking the application to the electronic device 300 as an example, the camera 301 of the electronic device 300 may capture an original image in real time and transmit it to the processor of the electronic device 300. Thereby causing the electronic device 300 to obtain the original image. In other embodiments, the original image may be downloaded from a network or transmitted to the electronic device 300 from other terminal devices, or the electronic device 3M may read the original image from its own memory, etc.

The foreground objects refer to a target object to be photographed within the field of view of the camera, such as portraits, animals, foods, and the like. Compared with the, the foreground objects are typically closer to the camera in object space. The foreground object area is the pixel area occupied by the foreground objects in the original image captured by the camera.

Background refers to contents other than the target objects to be photographed within the field of view of the camera, such as distant mountains, sky, buildings, and the like. The background is generally farther from the camera in object space than the foreground objects. The background area is the pixel area occupied by the background in the original image captured by the camera.

In step S404, a background distortion calibration is performed on the original image to obtain a first calibrated image.

The background distortion calibration refers to a calibration method that eliminates or optimizes the distortion of the background in the original image.

The background distortion calibration does not mean that only the background region of the original image is calibrated. In the embodiment of the present disclosure, the processor of the electronic device 300 may perform an overall background distortion calibration on the original image to obtain a first calibrated image. There is no need to determine the local region in the overall calibration, so that it is simpler and faster than the local calibration, and at the same time it can be avoided that only the background region is calibrated. Thereby, causing an abrupt change between the background region and the foreground object region in the first calibrated image obtained by the calibration.

In step S406, foreground objects distortion calibration is performed on the original image to obtain a second calibrated image.

The foreground objects distortion calibration refers to a calibration method that eliminates or optimizes the distortion of the foreground objects in the original image while taking into account the shape preservation of the foreground object.

The foreground objects distortion calibration does not mean that only the foreground object region of the original image is calibrated. In the embodiment of the present disclosure, the processor of the electronic device 300 may perform an overall foreground object distortion calibration on the original image to obtain a second calibrated image. There is no need to determine the local region to be calibrated in the overall calibration, so that it is simpler and faster than the local calibration. At the same time, it is avoided that only the foreground object region is calibrated, thereby causing an abrupt change between the background region and the foreground object region in the second calibrated image obtained by the calibration.

In step S408, the background region in the first calibrated image and the foreground object region in the second calibrated image are fused to obtain a calibrated image.

The original image includes a background region and a foreground object region, and accordingly, the first calibrated image and the second calibrated image generated by the original image processing also have a corresponding background region and a foreground object region, respectively.

In this step, the processor of the electronic device 300 may fuse the first calibrated image and the second calibrated image based on the background region in the first calibrated image and the foreground object region in the second calibrated image for obtaining the calibrated image.

In the image distortion calibration method, the background distortion calibration is perform on an original image to obtain a first calibrated image. A foreground objects distortion calibration is performed on the original image to obtain a second calibrated image. An image fuse based on the background region in the first calibrated image and the foreground object region in the second calibrated image is performed for obtaining the calibrated image, so that the distortion of the background region and the foreground object region are respectively calibrated pertinently. While the distortion of the background of the original image is calibrated, the preservation of the foreground objects is taken into account, the presenting effect of the calibrated image obtained by the calibration is improved.

The background distortion calibration performed on the original image in step S404 may be implemented by various camera distortion calibration methods. For example, in one embodiment, the background distortion calibration performed on the original image in step S404 for obtaining the first calibrated image may include: obtaining camera internal parameters of a camera capturing the original image, and performing a camera distortion calibration on the original image based on the camera internal parameters to obtain the first calibrated image. The camera internal parameters are intrinsic parameters of the camera, and after the camera is manufactured, the camera internal parameters are determined. Camera internal parameters can be obtained from the manufacturers or by calibrating the camera. The distortion of the captured original image caused by the radial distortion and the tangential distortion of the camera lens can be calibrated according to the camera internal parameters. FIG. 2 shows a first calibrated image obtained by performing an overall distortion calibration on the original image shown in FIG. 1 by using camera internal parameters.

The foreground object distortion calibration performed on the original image in the above step S406 may be implemented by performing one or more calibrations and/or processing on the original image. It is sufficient that the distortion of the foreground object in the obtained second calibrated image is eliminated or optimized while the shape of the foreground object is reserved. In one embodiment, the step of performing the foreground object distortion calibration on the original image to obtain the second calibrated image in the step S406 may include: directly performing the foreground object distortion calibration on the original image to obtain the second calibrated image. In another embodiment, the step of performing the foreground object distortion calibration on the original image to obtain the second calibrated image may also include: after performing the background distortion calibration on the original image to obtain the first calibrated image, performing a foreground object preserving process on the first calibrated image to obtain a second calibrated image. Herein, the foreground object preserving means that the foreground object is kept free from deformation, that is, the foreground object in the image is as close as possible to or keeps the image effect which is seen by human eyes in the object space. Accordingly, the foreground object preserving process is a process of eliminating the deformation of the foreground object in the image relative to its original shape, so that the foreground object in the image is restored to its original shape.

Figure 6:
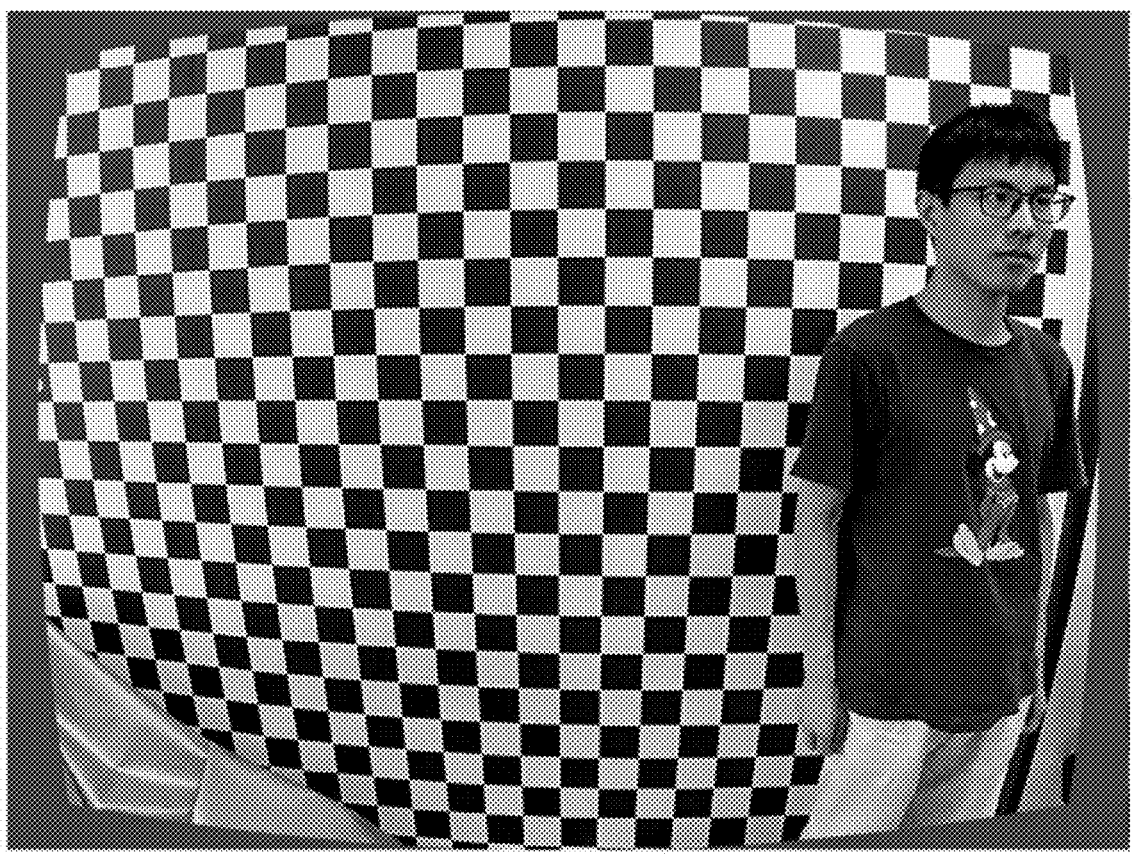
FIG. 6 is a second calibrated image in one embodiment.

Illustratively, the foreground object preserving process for the first calibrated image may be a spherical projection on the first calibrated image as shown in FIG. 2 for obtaining the second calibrated image as shown in FIG. 6. It can be seen that the portrait of the image edge in the second calibrated image shown in FIG. 6 is preserved as compared with the portrait of the image edge in the first calibrated image shown in FIG. 2, where the portrait of the image edge is significantly stretched, but the background in the second calibrated image is curved.

In one embodiment, before fusing the background region in the first calibrated image and the foreground object region in the second calibrated image to obtain the calibrated image in step S408, the method further includes: identifying the original image, to determine the foreground object region and the background region in the original image. Specifically, the electronic device 101 may perform image recognition on the original image by using a deep learning technique, thereby determining a foreground object region in the original image that needs to be preserved. By identifying the foreground object of the original image, the background region and the foreground object region in the original image can be determined. The background region and the foreground object region in the first calibrated image and the second calibrated image can also be determined accordingly, thereby facilitating subsequent image fusion processing. It can be understood that this step can be executed after the original image is obtained, for example, this step can also be executed before step S404.

Figure 7:
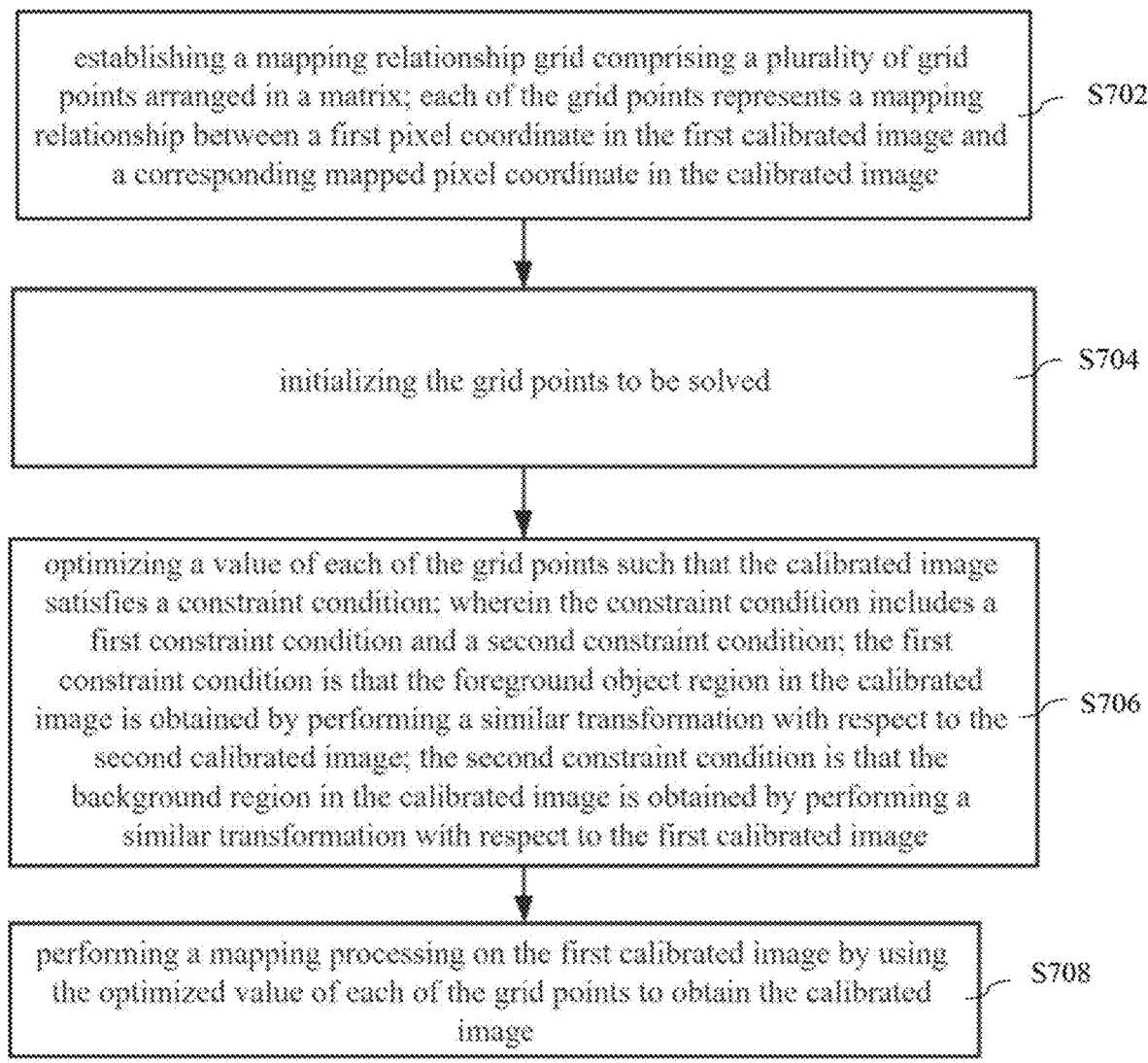
FIG. 7 is a schematic flow chart of an image fusion processes in an embodiment.

In one embodiment, as shown in FIG. 7, the step S410 of fusing the background region in the first calibrated image and the foreground object region in the second calibrated image to obtain a calibrated image includes the following steps.

In step S702, a mapping relationship grid is established. The mapping relationship grid includes a number of grid points arranged in a matrix. Each grid point represents a mapping relationship between a first pixel coordinate in the first calibrated image and a corresponding mapped pixel coordinate in the calibrated image.

Figure 8:
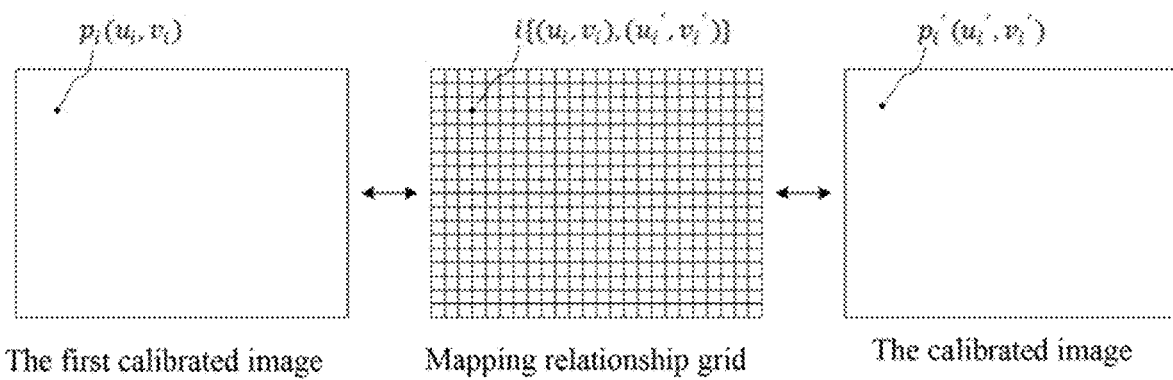
FIG. 8 is a schematic diagram of a mapping relationship grid in one embodiment.

Illustratively, the mapping relationship between the first calibration image and the calibrated image may be represented using a mapping relationship grid with M rows*N columns. The mapping relationship grid with M rows*N columns can uniformly cover the original image, so that each grid point at each grid vertex of the mapping relationship grid corresponds to one representative pixel at a corresponding position of the original image, and corresponds to one of the representative pixels of the first calibrated image, the second calibrated image and the calibrated image, respectively. FIG. 8 is a schematic diagram of a mapping relationship grid according to an embodiment. Wherein the value of each grid point i can be expressed as $\{(u_i, v_i), (u_i', v_i')\}$. Wherein $(u_i, v_i)$ represents the first pixel coordinates in the first calibrated image. $u_i$ is the abscissa of the first pixel coordinate, $v_i$ is the ordinate of the first pixel coordinate. It is to be understood that if the preserving process performed on the foreground object in step S406 is not performed, the calibrated image will be the same as the first calibrated image, and accordingly, $u_i=u_i'$, $v_i=v_i'$ is satisfied.

In this example, taking the aspect ratio of the original image of 4:3 as an example (for example, the resolution is 1024*768), M may be a fixed value of 80, and N may be a fixed value of 60. In other examples, the values of M and N may be determined according to actual requirements, such as the aspect ratio and resolution of the original image. The larger the values of M and N are, the higher the processing precision of the image is, but the more processing resources need to be occupied correspondingly, the lower the processing rate is.

In step S704, the grid points to be solved are initialized.

In this step, the processor of the electronic device 300 may initialize each grid point to be solved in the mapping relationship grid, that is, assign an initial value to each grid point $i\{(u_i,v_i),(u_i',v_i')\}$. Wherein, after the first calibrated image is obtained, the value of each first pixel coordinate $p_i(u_i,v_i)$ in the first calibrated image is determined, and thus the value of the $(u_i,v_i)$ part in the grid point $i\{(u_i,v_i),(u_i',v_i')\}$ is known. For the initial value of the $(u_i,v_i)$ part, the coordinates of each pixel in the first calibrated image and the second calibrated image can be comprehensively determined. The closer the initial value of the grid points assigned in this step is to the corresponding value in the final calibrated image that needs to be solved, the better the processing efficiency and quality in the subsequent optimization process can be improved.

In step S706, the values of each grid point are optimized, so that the image satisfies a constraint condition. The constraint condition includes a first constraint condition and a second constraint condition. The first constraint condition is that the foreground object region in the calibrated image is obtained by performing a similar transformation with respect to the second calibrated image. The second constraint is that the background region in the calibrated image is similarly transformed with respect to the first calibrated image.

The calibrated image obtained by the grid points initialized in the foregoing step S704 is generally rough, and therefore, in this step S706, according to the effect requirements to be achieved for the final calibrated image, the corresponding constraint conditions are established. The initial values of the grid points in step S704 are optimized by using the constraint conditions, so that the optimal values of the grid points are obtained.

In step S708, a mapping process is performed on the first calibrated image by using the value of each grid point obtained by the optimization to obtain a calibrated image.

The values of the respective grid points in the mapping relationship grid represent the mapping relationship between the respective representative pixels in the first calibrated image and the corresponding representative pixels in the calibrated image. Therefore, in this step, the first calibrated image can be mapped to the corresponding calibrated image by applying the optimized mapping relationship grid to the first calibrated image.

Specifically, the process of calculating the calibrated image by applying the mapping relationship grid of M*N to the first calibrated image may be a process of a bilinear interpolation. The process may include: for each pixel of the first calibrated image, calculating to determine which grid of the mapping relationship grid with M*N it belongs to respectively, and then the mapping pixel coordinates of the corresponding calibrated image are obtained through the bilinear interpolation. Then the corresponding pixel value of the calibrated image is obtained by one bilinear interpolation, so as to obtain the calibrated image.

In the above embodiment, the values of the grid points are optimized using the first constraint condition and the second constraint condition, so that the background object region in the finally obtained calibrated image is determined according to the first calibrated image, and the foreground object region is determined according to the second calibrated image, so that both background distortion calibration and foreground object preserving are taken into account.

However, since the pixel in the edge region of the foreground object will be largely displaced before and after the foreground object preserving process, in the case where the constraint condition includes only the first constraint condition and the second constraint condition, the transition region between the foreground object region and the background region in the generated calibrated image will be excessively abrupt and/or produce undesired deformation, which affects the display effect of the finally obtained calibrated image. In one embodiment, the constraint condition further includes a third constraint condition. The third constraint condition includes a smooth change between the foreground object region and the background region in the calibrated image. By including the third constraint condition, the transition between the foreground object region and the background region in the calibrated image can be made smooth, thereby improving the display effect of the calibrated image.

Further, as can be seen from the FIG. 6, due to the shift of the edge pixels, an invalid region without an image (gray region of the edge of FIG. 6) appears in the edge region of the second calibrated image subjected to the spherical projection processing, namely, the area of missing pixels. Similarly, an invalid region may also appear in the calibrated image generated by the fusing. In one embodiment, the above constraint condition may further include a fourth constraint condition. The fourth constraint condition is that no invalid region exists in the calibrated image. By including the fourth constraint condition, it is possible to prevent the occurrence of an invalid region in the edge region in the calibrated image, thereby improving the display effect of the calibrated image.

In one embodiment, the initialization of the grid points to be solved in step S704 includes the following.

For each grid points, the following operations are performed separately:

obtaining a first pixel coordinate corresponding to a current grid point, determining a number of first pixel coordinates within a predetermined grid area centered on the first pixel coordinate, determining a number of second pixel coordinates corresponding to the number of first pixel coordinates in the second calibrated image, calculating a weighted average of the number of first pixel coordinates and the number of second pixel coordinates, and assigning initial values to the mapped pixel coordinates corresponding to the current grid point by using the weighted average.

Wherein, the size of the predetermined grid area may be determined according to actual needs, for example, the predetermined grid area may be a grid area of about 4*4, 5*5, and 6*6 pixels centered on the first pixel coordinate.

In the present embodiment, initial values are assigned to each grid points in combination of the first pixel coordinates in the first calibrated image and the second pixel coordinates in the second calibrated image. Thus, the initial values of the grid points can be made close to the values required for the calibrated image to improve the efficiency of the subsequent optimization processing. And by performing a weighted average on the number of first pixel coordinates and the number of second pixel coordinates in the neighborhood of each grid points, as compared to directly using a single pixel coordinate to assign a value, the weighted average of the number of first pixel coordinates and the number of second pixel coordinates may enable a smooth transition between the foreground object region and the background region in the calibrated image corresponding to the initialized grid points, thereby further improving the efficiency and quality of the optimizing process.

In one embodiment, the step of optimizing the value of each grid points such that the calibrated image satisfies the constraint conditions includes: determining a penalty term according to the constraint conditions, establishing an optimization function by taking the value of the mapped pixel coordinate in the value of each grid point as a variable to be solved and combining the penalty term, and solving the optimal solution of the optimization function to determine the value of each grid points.

In this embodiment, the optimization process of the values of the grid points is converted into an optimization problem, and the variables to be solved are in each grid point $(u_i',v_i')$, and the above constraint conditions are respectively converted into penalty terms in the optimization problem, to determine an optimization function so that the values of the grid points can be determined by solving an optimal solution of the optimization function, making the scheme easier to be implemented.

In one embodiment, the penalty term includes a first penalty term determined according to a first constraint condition. The expression of the first penalty term is as follows:

$$E_1 = \Sigma_{i=1}^{N} w_i \|p_i' - (S_k q_i + t_k)\|_2^2$$

Wherein, $E_1$ is the first penalty term, the i represents a grid point i in the mapping relationship grid, N is the total number of grid points and $p_i$ is the first pixel coordinate corresponding to the grid point i in the first calibrated image, $q_i$ is the second pixel coordinate corresponding to the grid point i in the second calibrated image, $p_i'$ is the mapped pixel coordinate corresponding to the grid point i in the calibrated image, $w_i$ is the foreground object weight, when $p_i$ belongs to the foreground object area, $w_i=1$ and when $p_i$ belongs to the background region, $w_i=0$. $S_k$ is the similar transformation matrix of the k-th region in the first calibrated image, and $t_k$ is the two-dimensional translation vector of the k-th region.

The first calibrated image may be divided into a number of regions, and accordingly, the k represents the k-th region in the divided region in which the grid point i falls. When the first calibrated image being divided into 4 regions with 2 rows and 2 columns are taken as an example, for example, when $p_i$ falls into the second region of the upper right corner, the $S_k$ is the similar transformation matrix $S_2$ of the second region correspondingly. $t_k$ is the two-dimensional translation vector $t_2$ of the second region, and it is the same when $p_i$ falls into other regions.

$S_k$ may have the following form:

$$S_k = \begin{bmatrix} a_k & b_k \\ -b_k & a_k \end{bmatrix}.$$

Wherein, respectively, $a_k$ and $b_k$ are the parameters of the similar transformation matrix, and the above formula defines the value form.

In the present embodiment, if $p_i$ belongs to the foreground object region in the first calibrated image, the first penalty term will be calculated by using the $p_i$. The smaller the first penalty term is, the smaller the variation between the foreground object area in the calibrated image and the distribution of the foreground object area in the first calibrated image there will be, and the better the shape preserving effect is, thereby improving the shape preserving effect of the foreground object region in the calibrated image.

In one embodiment, the penalty term for each grid points includes a second penalty term determined according to the second constraint condition, the expression of the second penalty term is as follows:

$$E_2 = \Sigma_{i \in \partial_{Obj}} \Sigma_{j \in N(i)} \|(p_i' - p_j') \times e_{ij}\|_2^2$$

Wherein, $E_2$ is the second penalty item, i represents a grid point i in the mapping relationship grid, $\partial_{Obj}$ is a set of grid points corresponding to the background region in the mapping relationship grid, N(i) is a set of vertically and horizontally adjacent grid points of the grid point i, j represents the grid point j in the in the set of vertically and horizontally adjacent grid points i, $p_i'$ is a mapped pixel coordinate corresponding to the grid point i in the calibrated image, $p_j'$ is a mapped pixel coordinate corresponding to the grid point j in the calibrated image, x represents the cross product, and $e_{ij}$ is the unit vector of the $p_i$ to $q_i$.

In the present embodiment, if the $p_i$ in the first calibrated image does not belong to the foreground object region, then it belongs to the background region. The mapped pixel coordinates $p_i'$ $(u_i', v_i')$ corresponding to the $p_i$ and the degree of non-conformity in the horizontal and vertical directions of the $p_j'$ corresponding to the four adjacent grid points j with the grid point i as the center are calculated, so as to ensure that the background area is not deformed as much as possible. Specifically, the coordinate differences of the $p_i'$ in the horizontal direction with its upper and lower points $p_j'$ and the coordinate difference in the vertical direction with its left and right points $p_j'$ can be calculated as shown in the above formula. The smaller the corresponding coordinate difference is, the smaller the degree of curving of the background is.

In one embodiment, the penalty term includes a third penalty term determined according to a third constraint condition. The expression of the third penalty term is as follows:

$$E_3 = \Sigma_{i=1}^{N} \Sigma_{j \in N(i)} \|(p_i' - p_j')\|_2^2$$

Wherein, $E_3$ is the third penalty item, i represents the ith grid point in the mapping relationship grid, N represents the total number of grid points, N(i) is a set of vertically and horizontally adjacent grid points of the grid point i, j represents the grid point j in the set N(i), $p_i'$ the mapped pixel coordinate corresponding to the grid point i in the calibrated image, and $p_j'$ is the mapped pixel coordinate corresponding to the grid point j in the calibrated image.

In the present embodiment, for all the $p_i$ in the first calibrated image, the coordinate differences in the horizontal and vertical directions, respectively, of the $p_i'$ with respect to the four points $p_j'$ above, below, left and right centered thereon are calculated and this is taken as a regular term penalty for eliminating the abrupt changes of mapping in the mapping relation grid. The difference between the third penalty item and the second penalty item in this embodiment is that the second penalty item only acts on the background region, so that the background region in the calibrated image item and the background region distribution in the first calibrated image are as consistent as possible, ensuring that the background is still "horizontal and vertical". While the third penalty term is applied to the entire image so that the distribution of the respective regions in the calibrated image is balanced, i.e., the calibrated image is smooth, thereby reducing abrupt changes between the background region and the foreground object region in the resulting image.

In one embodiment, the penalty term includes a fourth penalty term determined according to a fourth constraint condition. The expressions of the fourth penalty term are as follows:

$$E_4 = E_l + E_r + E_t + E_b$$

$$E_l = \sum_{i \in \partial_{left}} \mathbb{1}(p_{i,x}' > 0) \cdot \|p_{i,x}'\|_2^2$$

$$E_r = \sum_{i \in \partial_{right}} \mathbb{1}(p_{i,x}' < W) \cdot \|p_{i,x}' - W\|_2^2$$

$$E_t = \sum_{i \in \partial_{top}} \mathbb{1}(p_{i,y}' > 0) \cdot \|p_{i,y}'\|_2^2$$

$$E_b = \sum_{i \in \partial_{bottom}} \mathbb{1}(p_{i,y}' < H) \cdot \|p_{i,y}' - H\|_2^2$$

Wherein, $E_4$ is a fourth penalty term, $E_l$ is a left boundary penalty term, $E_r$ is a right boundary penalty term, $E_t$ is a top boundary penalty term, $E_b$ is a bottom boundary penalty term, $\mathbb{1}(\cdot)$ is an indicator function, wherein the indicator function returns 1 when the condition · in the bracket is satisfied, Otherwise, 0 is returned. The i represents the ith grid point in the mapping relationship grid, $p_{i,x}'$ is the abscissa of the mapping pixel coordinates corresponding to the grid point i in the calibrated image, $p_{i,y}'$ is the ordinate of the mapping pixel coordinates corresponding to the grid point i in the calibrated image, $\partial_{left}$ is the set of the leftmost column of grid points in the mapping relationship grid, and $\partial_{right}$ is the set of the rightmost column of grid points in the mapping relationship grid, $\partial_{top}$ is the set of a column of grid points on the uppermost side of the mapping grid, $\partial_{bottom}$ is the set of a column of grid points on the lowermost side of the mapping grid, W is the width of the original image and H is the height of the original image.

In the present embodiment, if the $p_i$ in the mapping relationship grid belongs to the first row, the last row, the first column or the last column, when the $p_i'$ is within the effective area of the image, a distance value in the vertical direction from the top of the image and a distance value in the vertical direction from the bottom of the image, a distance value in the horizontal direction from the leftmost side of the image and a distance value in the horizontal direction from the rightmost side of the image are respectively calculated, such that the distance values satisfy a desired threshold as much as possible to include a fourth penalty term, the mapping of the mapping relationship grid is within the effective range, and there being no invalid region in the calibrated image.

The optimization function can be determined by combining the penalty terms corresponding to the constraint conditions. The optimization function may be a weighted sum of the penalty terms of all grid points in the mapping relationship grid. An optimization objective of the optimization function is to minimize the weighted sum. In one embodiment, the expression of the optimization function is as follows:

$$\{p_i'^*\} = \underset{\{p_i'\}}{\mathrm{argmin}}\, E_t(\{p_i'\})$$

Wherein, $p_i'$ is the mapped pixel coordinate corresponding to the grid point i in the calibrated image, $p_i'$ is the optimal solution of the mapped pixel coordinate, and $E_t$ is the weighted sum of each penalty item.

The $E_t$ can be expressed as:

$$E_t = \sum_{m=1}^{M} \lambda_m \cdot E_m$$

Wherein, $E_m$ is the m-th penalty item, $\lambda_m$ is the weight of $E_m$, and M is the total number of penalty terms.

For example, if the constraint condition includes the first constraint condition, the second constraint condition, the third constraint condition and the fourth constraint condition, there will be a first penalty term, a second penalty term, a third penalty term and a fourth penalty term. Then, the method may specifically be:

$$E_t = \lambda_1 \cdot E_1 + \lambda_2 \cdot E_2 + \lambda_3 \cdot E_3 + \lambda_4 \cdot E_4$$

In which, $\lambda_1$ is the weight of $E_1$, $\lambda_2$ is the weight of $E_2$, $\lambda_3$ is the weight of $E_3$, $\lambda_4$ is the weight of $E_4$.

The solving process of the optimization function is a nonlinear least squares problem, which can be solved by using Gauss Newton method, LM method and other methods to determine the optimal solution of the mapping pixel coordinates $p_i'$ ($u_i'$,$v_i'$) corresponding to each grid point i in the mapping relation grid. After the mapped pixel coordinates ($u_i'$,$v_i'$) of each grid point $\{(u_i, v_i),(u_i', v_i')\}$ are determined by the solution, the value of each grid point is determined accordingly because ($u_i$,$v_i$) is a known quantity. The values of the grid points in the obtained mapping relationship grid are applied to the first calibrated image, and the corresponding calibrated image can be obtained by performing mapping processing.

Figure 9:
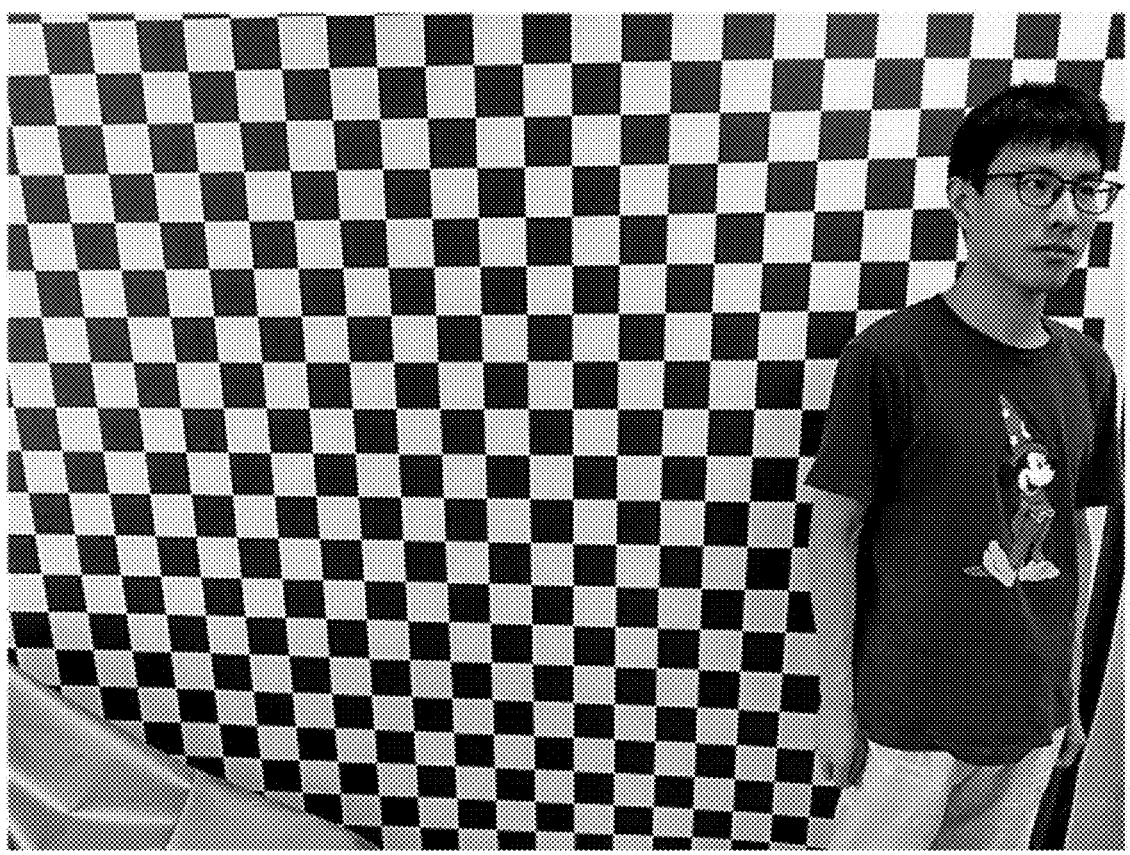
FIG. 9 is a calibrated image in one embodiment.

FIG. 8 shows, in one embodiment, a calibrated image of the corresponding solution determination when the above-mentioned first penalty item, second penalty item, third penalty item and fourth penalty item are simultaneously included. As can be seen from FIG. 9, in the calibrated image obtained by the image distortion calibration method of the present disclosure, both the distortion calibration of the background region and the shape preservation of the portrait region are taken into account, and the display effect of the calibrated image is effectively improved.

It should be understood that although the steps in the flowcharts of FIG. 4 and FIG. 7 are sequentially shown as indicated by the arrows, the steps are not necessarily sequentially performed in the order indicated by the arrows. Unless explicitly stated herein, these steps are performed in no strict order and may be performed in other orders. Moreover, at least a portion of the steps in FIG. 4 and FIG. 7 may include a number of sub-steps or stages, which are not necessarily performed at the same time, but may be performed at different times. The order of execution of these sub-steps or stages is also not necessarily sequential, but may be executed alternately or alternately with other steps or at least a portion of the sub-steps or stages of other steps.

Figure 10:
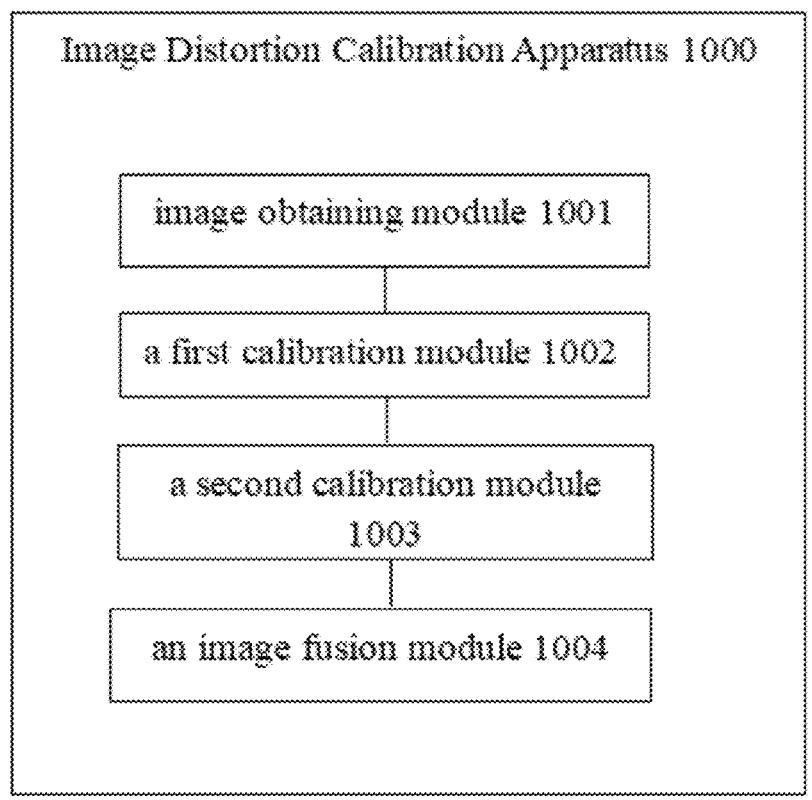
FIG. 10 is a block diagram showing the structure of a distortion calibration device in one embodiment.

In one embodiment, as shown in FIG. 10, an image distortion calibration apparatus 1000 is provided. The apparatus 1000 includes an image obtaining module 1001, a first calibration module 1002, a second calibration module 1003 and an image fusion module 1004. Wherein:

The image obtaining module 1001 is configured to obtain an original image including a background region and a foreground object region.

The first calibration module 1002 is configured to perform background distortion calibration on an original image to obtain a first calibrated image.

The second calibration module 1003 is configured to perform foreground object distortion calibration on the original image to obtain a second calibrated image.

The image fusing module 1004 is configured to fuse the background region in the first calibrated image and the foreground object region in the second calibrated image to obtain a calibrated image.

The image distortion calibration apparatus performs background distortion calibration on each of the original images to obtain first calibrated images, performs foreground object distortion calibration on the original image to obtain a second calibrated image, and performs image fusing based on the background region in the first calibrated image and the foreground object region in the second calibrated image for obtaining the calibrated image, so that the distortion of the background region and the foreground object region are respectively calibrated pertinently. While the distortion of the background of the original image is calibrated, the preservation of the foreground object is taken into account, the presenting effect of the calibrated image obtained by the calibration is improved.

For the specific limitations of the image distortion calibration device, the above limitation of the image distortion calibration method can be referred, and the detailed description thereof is omitted. Each module in the above described image distortion calibration apparatus may be wholly or partially implemented by software, hardware, and a combination thereof. The modules may be embedded in or independent of a processor in the computer device in the form of hardware, or may be stored in a memory in the computer device in the form of software, for being called by the processor to execute the operations correspond to the above modules.

Figure 11:
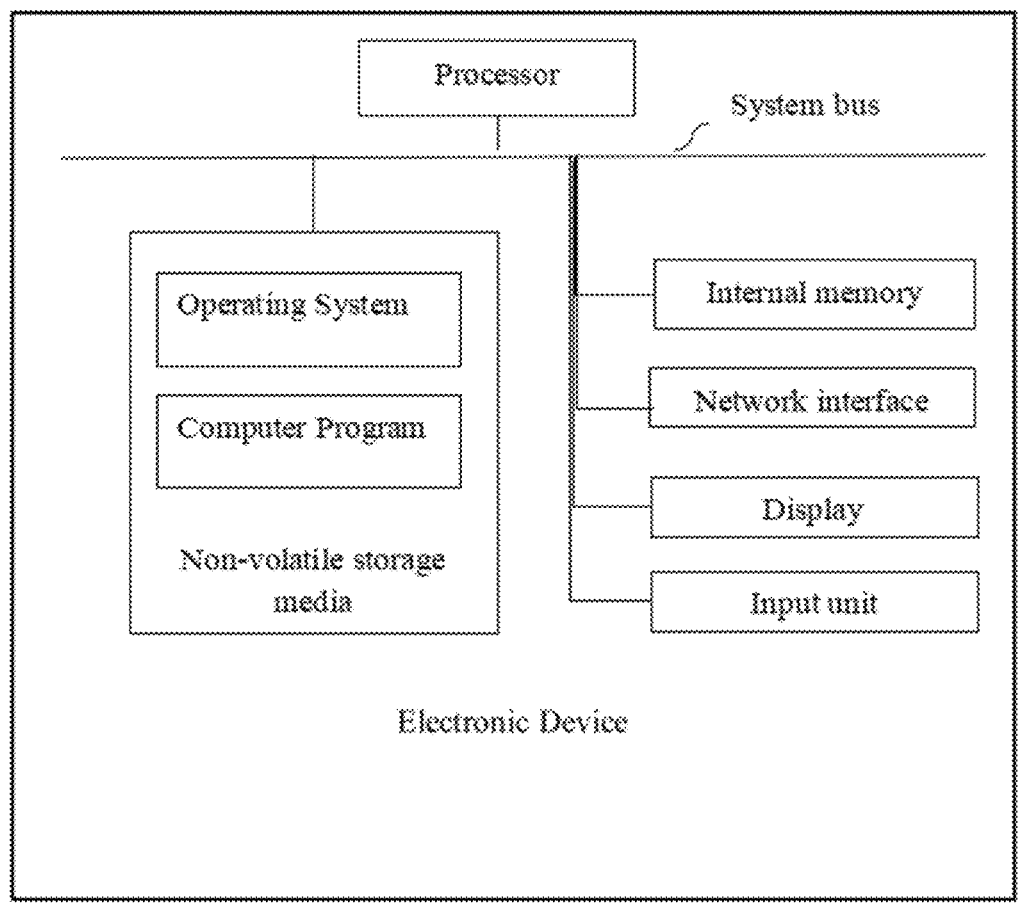
FIG. 11 is a schematic diagram of an internal structure of an electronic device according to an embodiment.

In one embodiment, an electronic device is provided. The internal structural diagram of the electronic device may be as shown in FIG. 11. The electronic device includes a processor, a memory, a network interface, a display screen, and an input device connected by a system bus. The processor of the electronic device is configured to provide computing and control capabilities. The memory of the electronic device includes a non-volatile storage medium and an internal memory. The non-volatile storage medium stores an operating system and a computer program. The internal memory provides an environment for the operation of the operating system and the execution of the computer program in the non-volatile storage medium. The network interface of the electronic device is configured to communicate with an external terminal via a network connection. The computer program is executed by the processor to implement an image distortion calibration method. The display screen of the electronic device may be, for example, a liquid crystal display screen, and the input device of the electronic device may be a touch layer covered on the display screen, or a key, a trackball or a touch pad provided on the housing of the electronic device, it can also be an external keyboard, touch pad or mouse.

Those skilled in the art can understand that the structure shown in FIG. 11 is only a block diagram of a part of the structure related to the solution of the present disclosure, and does not constitute a limitation on the electronic device to which the solution of the present disclosure is applied. A particular electronic device may include more or fewer components than shown in the figures, or combine certain components, or have a different arrangement of components.

Figure 12:
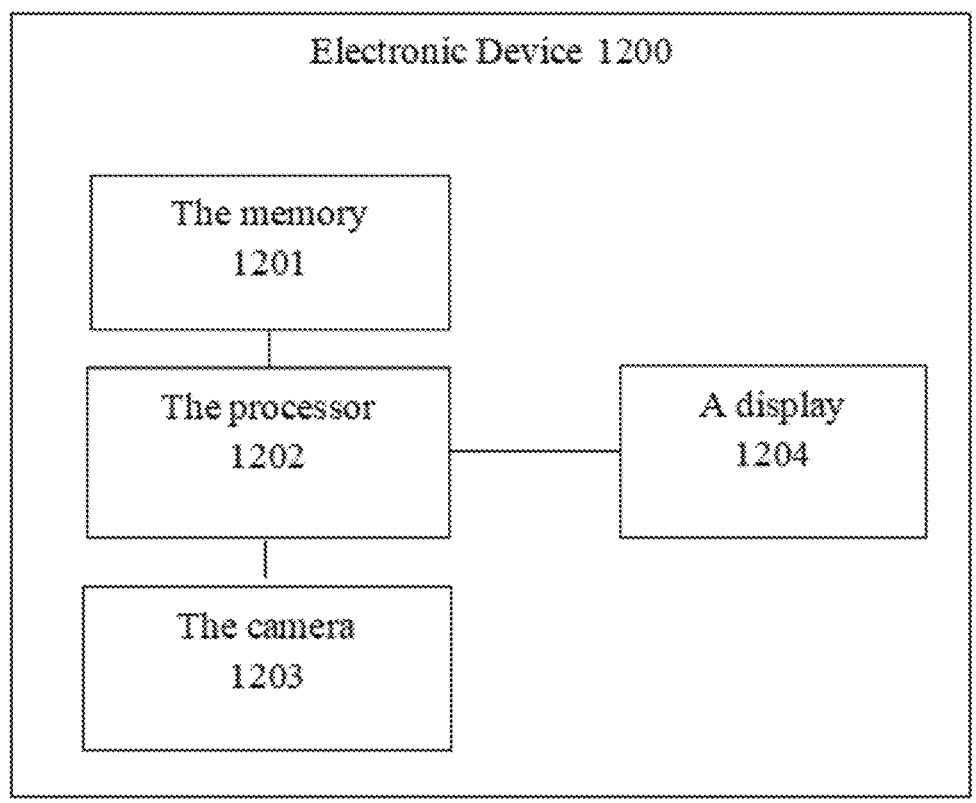
FIG. 12 is a schematic diagram of an internal structure of an electronic device according to another embodiment.

In one embodiment, as illustrated in FIG. 12, an electronic device 1200 is provided. The electronic device 1200 includes a memory 1201 and a processor 1202. The memory 1201 is coupled to the processor 1202. The memory 1201 had a computer program stored therein. The processor 1202 implements the following steps when executing the computer program.

obtaining an original image, the original image includes a background region and a foreground object region;

performing a background distortion calibration on the original image to obtain a first calibrated image;

performing a foreground object distortion calibration on the original image to obtain a second calibrated image, and fusing the background region in the first calibrated image and the foreground object region in the second calibrated image to obtain a calibrated image.

The electronic device performs background distortion calibration on each of the original images to obtain the first calibrated images, performs a foreground object distortion calibration on the original image to obtain a second calibrated image, and performs an image fusing based on the background region in the first calibrated image and the foreground object region in the second calibrated image for obtaining the calibrated image, so that the distortion of the background region and the foreground object region are respectively calibrated pertinently. While the distortion of the background of the original image is calibrated, the preservation of the foreground object is taken into account, the presenting effect of the calibrated image obtained by the calibration is improved.

In one embodiment, as shown in FIG. 12, the electronic device 1200 may further include a camera 1203 coupled with the electronic device 1200. The "coupling" is intended to include both the form of arranging the camera directly in the electronic device 1200, and also includes a form in which a camera is disposed outside the electronic device (for example, the camera is disposed on other terminal devices), and a communication connection between the camera and the electronic device 1200. The camera 1203 is connected to a processor 1202 for capturing an original image and transmitting the original image to the processor 1202. The processor 1202 receives the original image from the camera 1203.

In one embodiment, as shown in FIG. 12, the electronic device 1200 may further include a display 1204 coupled to the processor 1202. When executing the computer program by the processor 1202, the processor 1202 controls the display 1204 to display the calibrated image.

In other embodiments, when the processor 1202 executes the computer program, the steps of the image distortion calibration method of the above embodiments of the present disclosure are also implemented, and the method has corresponding advantageous effects.

In one embodiment, a computer readable storage medium having store thereon a computer program is provided. When executed by a processor, the following steps are implemented:

obtaining an original image, the original image includes a background region and a foreground object region;

performing a background distortion calibration on the original image to obtain a first calibrated image;

performing a foreground object distortion calibration on the original image to obtain a second calibrated image, and fusing the background region in the first calibrated image and the foreground object region in the second calibrated image to obtain a calibrated image.

The compute readable storage medium performs background distortion calibration on each of the original images to obtain the first calibrated images, performs a foreground object distortion calibration on the original image to obtain a second calibrated image, and performs an image fusing based on the background region in the first calibrated image and the foreground object region in the second calibrated image for obtaining the calibrated image, so that the distortion of the background region and the foreground object region are respectively calibrated pertinently. While the distortion of the background of the original image is calibrated, the preservation of the foreground object is taken into account, the presenting effect of the calibrated image obtained by the calibration is improved.

In other embodiments, when the computer program is executed by the processor, the steps of the image distortion calibration method of the above-described embodiments of the present application are also implemented, and have corresponding advantageous effects.

Those of ordinary skill in the art can understand that all or part of the processes in implementing the method of the above embodiments may be performed by instructing related hardware by a computer program. The computer program may be stored in a non-volatile computer-readable storage medium. The computer program, when executed, may include the processes of the embodiments of the methods described above. Among other things, any reference to memory, storage, database, or other medium used in the embodiments provided herein may include non-volatile and/or volatile memory. The non-volatile memory may include read only memory (ROM), programmable ROM (PROM), electrically programmable ROM (EPROM), electrically erasable programmable ROM (EEPROM), or flash memory. The volatile memory may include random access memory (RAM) or an external cache memory. By way of illustration and not limitation, the RAM is available in a variety of forms, such as static RAM (SRAM), dynamic RAM (DRAM), synchronous DRAM (SDRAM), dual data rate SDRAM (DDRSDRAM), enhanced SDRAM (ESDRAM), synchronous link DRAM (SDRAM), memory bus (Rambus direct ram (RDRAM). Direct memory bus dynamic RAM (DRDRAM), memory bus dynamic RAM (RDRAM), and the like.

The technical features of the above embodiments may be arbitrarily combined. For brevity of description, all possible combinations of the technical features in the above embodiments are not described, however, as long as there is no contradiction in the combination of these technical features, it should be considered as the scope described in this specification.

The above-described embodiments are merely illustrative of several embodiments of the present application and are described in more detail, but are not to be construed as limiting the scope of the invention patent. It should be noted that a number of modifications and improvements may be made to those of ordinary skill in the art without departing from the spirit of the present application, all of which are within the scope of protection of the present application. Accordingly, the scope of protection of the present patent application shall be subject to the appended claims.

What is claimed is:

1. A method for image distortion calibrating, comprising:
    obtaining an original image; the original image including a background region and a foreground object region;
    performing a background distortion calibration on the original image to obtain a first calibrated image;
    performing a foreground object distortion calibration on the original image to obtain a second calibrated image; and
    fusing the background region in the first calibrated image and the foreground object region in the second calibrated image to obtain a calibrated image, wherein the fussing further comprises:
        establishing a mapping relationship grid comprising a plurality of grid points arranged in a matrix; each of the grid points represents a mapping relationship between a first pixel coordinate in the first calibrated image and a corresponding mapped pixel coordinate in the calibrated image;
        initializing the grid points to be solved;
        optimizing a value of each of the grid points such that the calibrated image satisfies a constraint condition: wherein the constraint condition includes a first constraint condition and a second constraint condition: the first constraint condition is that the foreground object region in the calibrated image is obtained by performing a similar transformation with respect to the second calibrated image: the second constraint condition is that the background region in the calibrated image is obtained by performing a similar transformation with respect to the first calibrated image; and
        performing a mapping processing on the first calibrated image by using the optimized value of each of the grid points to obtain the calibrated image.

2. The method of claim 1, wherein the step of performing the foreground object distortion calibration on the original image to obtain the second calibrated image comprises:
    performing foreground object preserving processing on the first calibrated image to obtain a second corrected image after performing the background distortion calibration on the original image to obtain k first calibrated image.

3. The method of claim 1, wherein the constraint condition further comprises a third constraint condition; the third constraint condition includes a smooth change between a foreground object region and a background region in the calibrated image.

4. The method of claim 3, wherein the constraint condition further comprises a fourth constraint condition; the fourth constraint condition being that there is no invalid region in the calibrated image.

5. The method of claim 1, wherein the step of initializing the grid points to be solved comprises:
    acquiring a first pixel coordinate corresponding to a current grid point;
    determining a plurality of first pixel coordinates within a predetermined grid area centered on the first pixel coordinates, and determining a plurality of second pixel coordinates in a second corrected image corresponding to the plurality of first pixel coordinates;
    calculating a weighted average value of the plurality of first pixel coordinates and the plurality of second pixel coordinates;
    performing an initial value assignment on mapping pixel coordinates corresponding to the current grid point by using the weighted average value.

6. The method of claim 4, wherein the step of optimizing the value of each of the grid points such that the calibrated image satisfies the constraint condition comprises:
    determining a penalty term according to the constraint condition;
    establishing an optimization function by taking a value of a mapped pixel coordinate in the value of each of the grid points as a variable to be solved and combining the penalty term; and solving an optimal solution of the optimization function to determine the value of each of the grid points.

7. The method of claim 6, wherein the penalty term includes a first penalty term determined according to the first constraint condition; an expression of the first penalty term is:

$E_1 = \sum_{i=1}^{N} w_i \|p_i' - (S_k q_i + t_k)\|_2^2$; wherein, $E_1$ is the first penalty term, i represents a grid point i in the mapping relationship grid, N is a total number of grid points, $p_i$ is the first pixel coordinate corresponding to the grid point i in the first calibrated image, $q_i$ is the second pixel coordinate corresponding to the grid point i in the second calibrated image, $p_i'$ is a mapped pixel coordinate corresponding to the grid point i in the calibrated image, $w_i$ is a foreground object weight, when $p_i$ belongs to a foreground object region, $w_i=1$ and when $p_i$ belongs to the foreground object region, $w_i=0$; $S_k$ is a similar transformation matrix of the k-th region in the first calibrated image, and $t_k$ is a two-dimensional translation vector of the k-th region.

8. The method of claim 6, wherein the penalty term for each grid point includes a second penalty term determined according to the second constraint condition, an expression of the second penalty term is $E_2 = \sum_{i \in \partial_{Obj}} \sum_{j \in N(i)} \|(p_i' - p_j') \times e_{ij}\|_2^2$;

wherein, $E_2$ is the second penalty item, i represents a grid point i in the mapping relationship grid, $\partial_{Obj}$ is a set of grid points corresponding to the background region in the mapping relationship grid, N(i) is a set of vertically and horizontally adjacent grid points of the grid point i, j represents the grid point j in the set of vertically and horizontally adjacent grid point i, $p_i'$ is a mapped pixel coordinate corresponding to grid point i in the calibrated image, $p_j'$ is a mapped pixel coordinate corresponding to a grid point j in the calibrated image, x represents a cross product, and $e_{ij}$ is a unit vector of $p_i$ to $q_i$.

9. The method of claim 6, wherein the penalty term includes a third penalty term determined according to the third constraint condition; an expression of the third penalty term is:

$E_3 = \sum_{i=1}^{N} \sum_{j \in N(i)} \|(p_i' - p_j')\|_2^2$;

wherein, $E_3$ is the third penalty item, i represents a grid point i in the mapping relationship grid, N represents a total number of grid points, N(i) is a set of vertically and horizontally adjacent grid points of the grid point i, j represents the grid point j in the set N(i), $p_i'$ is a mapped pixel coordinate corresponding to the grid point i in the calibrated image, and $p_j'$ is a mapped pixel coordinate corresponding to the grid point j in the calibrated image.

10. The method of claim 6, wherein the penalty term includes the fourth penalty term determined according to a fourth constraint condition; expressions of the fourth penalty term are:

$$E_4 = E_l + E_r + E_t + E_b$$

$$E_l = \sum_{i \in \partial_{left}} \mathbb{I}(p_{i,x}' > 0) \cdot \|p_{i,x}'\|_2^2$$

$$E_r = \sum_{i \in \partial_{right}} \mathbb{I}(p_{i,x}' < W) \cdot \|p_{i,x}' - W\|_2^2$$

$$E_t = \sum_{i \in \partial_{top}} \mathbb{I}(p_{i,y}' > 0) \cdot \|p_{i,y}'\|_2^2$$

$$E_b = \sum_{i \in \partial_{bottom}} \mathbb{I}(p_{i,y}' < H) \cdot \|p_{i,y}' - H\|_2^2;$$

wherein, $E_4$ is a fourth penalty term, $E_l$ is a left boundary penalty term, $E_r$ is a right boundary penalty term, $E_t$ is a top boundary penalty term, $E_b$ is a bottom boundary penalty term, $\mathbb{I}(\cdot)$ is an indicator function; wherein the indicator function returns 1 when a condition, in the bracket is satisfied, otherwise, 0 is returned; i represents a grid point i in the mapping relationship grid, $p_{i,x}'$ is an abscissa of the mapping pixel coordinates corresponding to the grid point i in the calibrated image, $p_{i,y}'$ is an ordinate of the mapping pixel coordinates corresponding to the grid point i in the calibrated image, $\partial_{left}$ is a set of the leftmost column of grid points in the mapping relationship grid, and $\partial_{right}$ is a set of the rightmost column of grid points in the mapping relationship grid, $\partial_{top}$ is a set of a column of grid points on the uppermost side of the mapping grid, $\partial_{bottom}$ is a set of a column of grid points on the lowermost side of the mapping relationship grid, W is a width of the original image and H is a height of the original image.

11. The method of claim 6, wherein an expression of the optimization function is:

$$\{p_i'^*\} = \underset{\{p_i'\}}{\mathrm{argmin}} \, E_t(\{p_i'\})$$

wherein, $p_i'$ is a mapped pixel coordinate corresponding to a grid point i in the calibrated image, $p_i'$ is the optimal solution of the mapped pixel coordinate corresponding to the grid point i, and $E_t$ is a weighted sum of each penalty item.

12. An image distortion calibration apparatus, comprising:
an image obtaining module, configured to obtain an original image including a background region and a foreground object region;
a first calibration module, configured to perform a background distortion calibration on the original image to obtain a first calibrated image;
a second calibration module, configured to perform a foreground object distortion calibration on the original image to obtain a second calibrated image; and
an image fusing module, configured to fuse the background region in the first calibrated image and the foreground object region in the second calibrated image to obtain a calibrated image, wherein the image fusing module is further configured to:
establish a mapping relationship grid comprising a plurality of grid points arranged in a matrix: each of the grid points represents a mapping relationship between a first pixel coordinate in the first calibrated image and a corresponding mapped pixel coordinate in the calibrated image;
initializing the grid points to be solved;
optimize a value of each of the grid points such that the calibrated image satisfies a constraint condition; wherein the constraint condition includes a first constraint condition and a second constraint condition; the first constraint condition is that the fore round object region in the calibrated image is obtained by performing a similar transformation with respect to the second calibrated image; the second constraint condition is that the background region in the calibrated image is obtained by performing a similar transformation with respect to the first calibrated image; and perform a mapping processing on the first calibrated image by using the optimized value of each of the grid points to obtain the calibrated image.

13. An electronic device comprising a memory and a processor; wherein the memory is coupled to the processor; the memory stores a computer program; and the processor is configured to implement the method of claim 1 when executing the computer program.

14. A non-transitory computer-readable storage medium having stored thereon a computer program, wherein the computer program, when executed by a processor, is configured to implement the method of claim 1.

* * * * *